United States Patent [19]

Jumel

[11] 4,195,123
[45] Mar. 25, 1980

[54] NON-AQUEOUS ELECTROLYTE LITHIUM BATTERY WITH IMPROVED STORAGE LIFE

[75] Inventor: Yves Jumel, Poitiers, France

[73] Assignee: Saft-Societe des Accumulateurs Fixes et de Traction, Romainville, France

[21] Appl. No.: 2,090

[22] Filed: Jan. 9, 1979

[30] Foreign Application Priority Data

Jan. 10, 1978 [FR] France ................... 78 00507

[51] Int. Cl.$^2$ ............................................. H01M 6/14
[52] U.S. Cl. ................................... 429/194; 429/228
[58] Field of Search ................ 429/194, 196, 197, 228

[56] References Cited

U.S. PATENT DOCUMENTS 3,870,561  3/1975  Charbonnier et al. ......... 429/194 X
3,960,594  6/1976  Fritz et al. ....................... 429/194
4,049,892  9/1977  Kronenberg .................... 429/194

Primary Examiner—Charles F. Lefevour
Attorney, Agent, or Firm—Kenyon & Kenyon

[57] ABSTRACT

In an electrochemical cell having a non-aqueous electrolyte which comprises a solute and at least one solvent, a lithium negative electrode, and a positive active material of said cell which is slightly soluble in said solvent, the surface of the negative electrode is alloyed with at least one metal chosen from the group consisting of lead, tin, antimony and silver, to prevent selective localized deposition onto the lithium electrode of metal reduced from the positive active material during storage. The improvement is particularly applicable to cells in which the positive active material is lead oxide and said solvent is dioxolane.

5 Claims, 1 Drawing Figure

U.S. Patent  Mar. 25, 1980  4,195,123
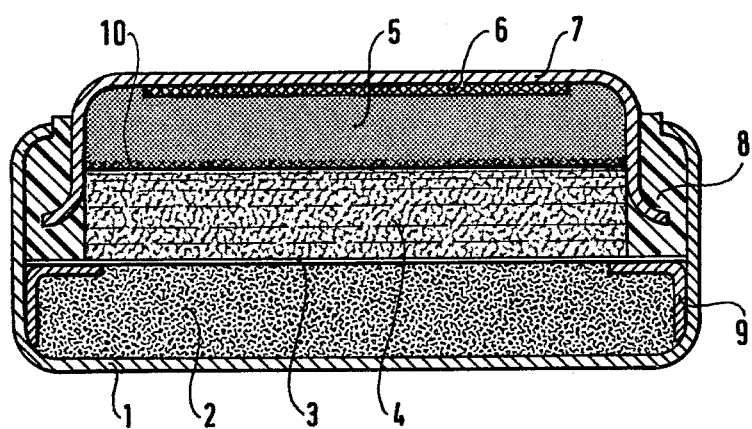

NON-AQUEOUS ELECTROLYTE LITHIUM BATTERY WITH IMPROVED STORAGE LIFE

The present invention relates to an electrochemical cell having a non-aqueous electrolyte, and more particularly to a primary cell whose positive active material is very slightly soluble in the solvent of the electrolyte. This is the case, for example, with lithium lead oxide cells using dioxolane as their electrolyte solvent.

During storage of such a cell, the dissolved lead oxide moves towards the negative electrode where it is reduced to lead which is deposited on the lithium. The quantity of lead thus lost is small, so this would not be a great disadvantage if it were not for the occurrence of the following phenomenon: instead of spreading out regularly over the surface of the lithium electrode, the lead is deposited only at certain privileged points. This selective deposition causes dendrites to develop perpendicularly to the surface of the electrode at these points. Eventually these dendrites may perforate the separator and come into contact with the positive electrode, thus short-circuiting the cell.

The invention mitigates this disadvantage.

It provides an electrochemical cell including a non-aqueous electrolyte which comprises a solute and at least one solvent; a lithium negative electrode; and a positive active material which is slightly soluble in said solvent; wherein the surface of the negative electrode is alloyed with at least one of the following metals: lead, tin, antimony and silver.

Advantageously, lead is used when the positive active material is lead oxide and in particular when said solvent is dioxolane.

"Surface of the negative electrode" means a very thin layer, in the order of a few hundredths of a millimeter when the thickness of the negative electrode lies between 0.5 mm and 1.5 mm.

The invention also provides a method of manufacturing such a negative electrode, in accordance with which a sheet of the said metal is pressed against the surface of the electrode, said sheet having a thickness in the order of a few hundredths of a millimeter, e.g. lying between 0.005 mm and 0.03 mm. For an electrode of 1 cm$^2$ surface area, the minimum desirable pressure for pressing the metal against the electrode is 20 kg/cm$^2$. For electrodes of greater surface area the minimum desirable pressure is greater.

Although this method is the preferred method, a thin layer of the said metal may also be deposited on the lithium surface either by vapor deposition or by spraying and the metal-plated lithium is then pressed (e.g., rolled) to alloy the metal to the lithium, using a pressure of the same order of magnitude as that used in the previous method, although the minimum workable pressure is lower.

One example of a button-type cell in accordance with the invention will be described hereinbelow with reference to the single accompanying FIGURE, which is a diagrammatic cross-section of the cell.

Such a cell includes a casing whose outside diameter is in the order of 10 mm and whose height is 5 mm and which is formed by a cap 7 and a cup 1 made of nickel-plated steel or stainless steel. The cup and the cap are separated by a seal 8 made of a plastic material for sealing and for electrically insulating the cup from the cap. The positive cup 1 contains a powdered active material 2, for example lead oxide, to which an electron conductor is added in a known way together with a binding agent, if needed. The active mass is compressed in the cup 1, which includes a metal ring 9 made of nickel-plated steel or stainless steel, said metal ring being used to contain the active material and to reinforce the support of the seal 8 against the pressure of the cup 1 while the lip of the cup 1 is being bent back over the seal 8. The negative cap 7 contains a lithium pellet 5 including a current collector 6 constituted by a nickel-plated steel or stainless steel grid welded to the cap. The thickness of the lithium electrode lies between 0.5 mm and 1.5 mm. The surface of the electrode situated on the positive electrode side is alloyed with lead, the thickness of the layer 10 of the alloy lying preferably between approximately 0.005 mm and 0.03 mm.

The positive and negative electrodes are separated by a paper barrier 3 and layers of cellulose felt 4 impregnated with electrolyte. The electrolyte includes at least one non-aqueous solvent such as dioxolane.

In accordance with the invention the alloy layer 10 can be obtained very simply by pressing a very thin sheet of lead onto the surface of the lithium electrode preferably with a pressure of about 20 kg/cm$^2$. The lead then diffuses into the lithium and a genuine alloy is formed. During subsequent storage of the cell, the metallic lead reduced from the lead oxide coming from the positive electrode is then deposited regularly over the whole surface of the negative electrode, without being concentrated at certain points as in the case of pure lithium electrode.

The surface alloy does not hinder the discharge of the cell.

The invention is not limited to the embodiment which has just been described. The lead alloy can be replaced by an alloy of tin, antimony, and/or silver. The invention applies to lithium cells which have positive active materials which are very slightly soluble in the solvent of the electrolyte, and not only to cells using lead oxide as the positive active material.

I claim:

1. An electrochemical cell including a lithium negative electrode; a non-aqueous electrolyte which comprises a solute and at least one organic solvent; and a positive electrode spaced from the negative electrode, the positive electrode having a positive active material which is slightly soluble in said solvent; wherein the improvement comprises:

only the surface of the negative electrode being alloyed with at least one metal selected from the group formed by lead, tin, antimony and silver.

2. A cell according to claim 1, wherein the alloy layer has a thickness in the order of a few hundredths of a millimeter.

3. A cell according to claim 1 wherein the thickness of the alloy layer is between approximately 0.005 and 0.03 mm.

4. A cell according to claim 1, wherein said positive active material comprises lead oxide.

5. A cell according to claim 1, 2 or 3, wherein said solvent is dioxolane.

* * * * *